(12) United States Patent
Teo et al.

(10) Patent No.: US 8,674,549 B2
(45) Date of Patent: Mar. 18, 2014

(54) SYSTEM AND METHOD FOR ENERGY TRANSFER

(75) Inventors: Koon Hoo Teo, Lexington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 388 days.

(21) Appl. No.: 12/686,466

(22) Filed: Jan. 13, 2010

(65) Prior Publication Data

US 2011/0169335 A1      Jul. 14, 2011

(51) Int. Cl.
*H01F 27/42* (2006.01)
*H01F 37/00* (2006.01)
*H01F 38/00* (2006.01)

(52) U.S. Cl.
USPC .............................. 307/104; 320/108; 320/109

(58) Field of Classification Search
USPC .......................................................... 307/104
See application file for complete search history.

(56) References Cited

U.S. PATENT DOCUMENTS

| | | |
|---|---|---|
| 2007/0222542 A1 | 9/2007 | Joannopoulos |
| 2008/0278264 A1 | 11/2008 | Karalis |
| 2009/0284083 A1 * | 11/2009 | Karalis et al. ................. 307/104 |
| 2010/0123355 A1 * | 5/2010 | Joannopoulos et al. ...... 307/104 |
| 2010/0123530 A1 * | 5/2010 | Park et al. ..................... 333/219 |
| 2010/0164296 A1 * | 7/2010 | Kurs et al. ..................... 307/104 |

OTHER PUBLICATIONS

Gennady Shvets and Yaroslav A Urzhimov; Negative Index metamaterial based on two-dimensional metallic structures, Published Mar. 22, 2006; J. Opt. A: Pure and Applied Optices; pp. S122-S130.*

* cited by examiner

*Primary Examiner* — Rexford Barnie
*Assistant Examiner* — Toan Vu
(74) *Attorney, Agent, or Firm* — Dirk Brinkman; Gene Vinokur (57) ABSTRACT

A system includes a structure configured to exchange the energy wirelessly via a coupling of evanescent waves. The structure is non-radiative, and generates an electromagnetic (EM) near-field in response to receiving the energy. The structure is configured to exchange the energy when the structure is in the resonant mode. The system also includes a tuning module configured to transition the structure in and out of the resonant mode based on an instruction, an energy monitor module configured to determine the instruction based on information indicative of the energy stored and/or exchange by the structure, and a transceiver configured to transmit and/or to receive the instruction.

17 Claims, 7 Drawing Sheets

SYSTEM AND METHOD FOR ENERGY TRANSFER

RELATED APPLICATIONS

This application is related to U.S. patent application Ser. No. 12/630,498 filed Dec. 3, 2009, entitled "Wireless Energy Transfer with Negative Index Material" filed by Koon Hoo Teo, incorporated herein by reference.

FIELD OF THE INVENTION

The present invention relates to transferring energy, and more particularly, to transferring energy wirelessly.

BACKGROUND OF THE INVENTION

Wireless Energy Transfer

Inductive coupling is used in a number of wireless energy transfer applications such as charging a cordless electronic toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

Resonant Coupling System

In resonant coupling, two resonant electromagnetic objects, i.e., the source and the sink, interact with each other under resonance conditions. The resonant coupling transfers energy from the source to the sink over a mid-range distance, e.g., a few times of the resonant frequency wavelength.

Figure 1:
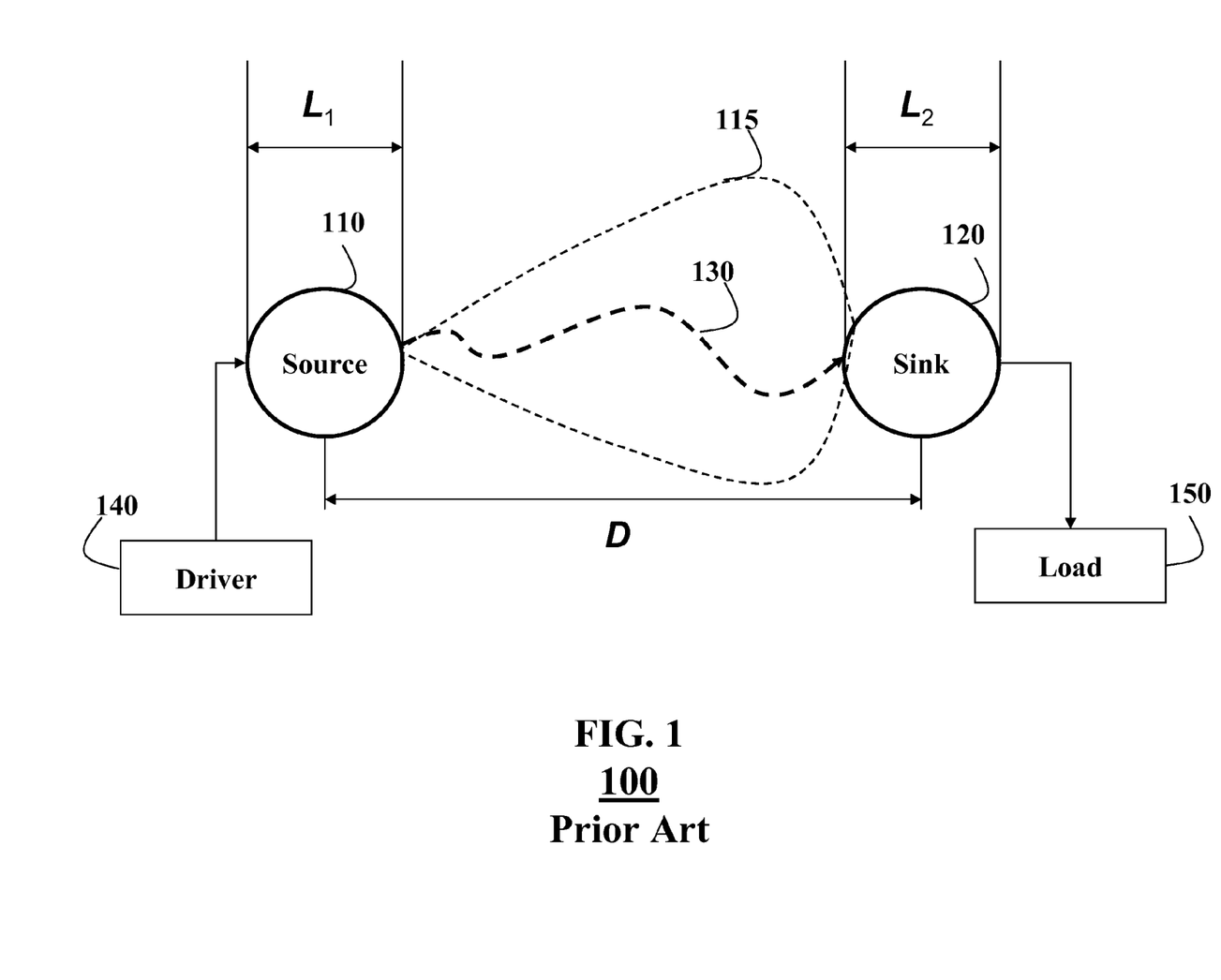
FIG. 1 is a block diagram of a conventional resonant coupling system.

FIG. 1 shows a conventional resonant coupling system 100 for transferring energy from a resonant source 110 to a resonant sink 120. The general principle of operation of the system 100 is similar to inductive coupling. A driver 140 inputs the energy into the resonant source to form an oscillating electromagnetic field 115. The excited electromagnetic field attenuates at a rate with respect to the excitation signal frequency at the driver or self resonant frequency of the source and the sink for a resonant system. However, if the resonant sink absorbs more energy than is lost during each cycle, then most of the energy is transferred to the sink. Operating the resonant source and the resonant sink at the same resonant frequency ensures that the resonant sink has a low impedance at that frequency, and that the energy is optimally absorbed. Example resonant coupling systems are disclosed in U.S. patent applications 2008/0278264 and 2007/0222542, incorporated herein by reference.

The energy is transferred, over a distance D, between resonant objects, e.g., the resonant source having a size $L_1$ and the resonant sink having a size $L_2$. The driver connects a power provider to the source, and the resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this specification, the field 115 is an electromagnetic field. During the coupling of the resonant objects, evanescent waves 130 are propagated between the resonant source and the resonant sink.

Coupling Enhancement

According to coupling mode theory, strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, there are even and odd mode resonant frequencies, due to the coupling effect. The coupling coefficient of two objects resonant system formed by two identical resonant structures is calculated by a partitioning of the even and odd modes according to $$\kappa = \pi |f_{even} - f_{odd}| \tag{1}$$

It is a challenge to optimize the coupling. For example, to optimize the coupling, resonant objects with a high quality factor are selected. However, that solution is based on a design of a particular resonant system, which may not be applicable to other resonant systems.

During the coupling of the resonant objects, the evanescent wave 130 is propagated between the resonant source and the resonant sink, which confine the energy within the system. A range of the energy transfer, i.e., the distance D, is limited to about 3 to 8 times the characteristic size of the resonant source. For example, for a 30 cm loop, the range is approximately between 90 cm to 2.5 m. In addition, the coupling and hence the efficiency decrease with the distance between the source and the sink.

Accordingly, it is desired increase the range of the energy transfer between the source and the sink.

SUMMARY OF THE INVENTION

Embodiments of the invention are based on a realization that a distance of energy transfer between a source node and a sink node can be increased by a communication network of relay nodes arranged in the neighborhood of the source and sink.

In one embodiment, a system configured to exchange energy wirelessly is disclosed. The system comprises a structure configured to exchange the energy wirelessly via a coupling of evanescent waves, wherein the structure is electromagnetic (EM) and non-radiative, and wherein the structure is a resonant having a resonant mode, wherein the structure is configured to exchange the energy when the structure is in the resonant mode, and to store the energy when the structure is not in the resonant mode; a tuning module configured to transition the structure in and out of the resonant mode based on an instruction; an energy monitor module configured to determine the instruction based on information indicative of the energy stored and/or exchanged by the structure; and a transceiver configured to transmit and/or to receive the instruction, e.g., wirelessly or through the wireline communication infrastructure.

Another embodiment discloses a method for exchanging energy wirelessly via a coupling of evanescent waves, comprising steps of: providing a structure configured to exchange the energy wirelessly via the coupling of evanescent waves, wherein the structure is electromagnetic (EM) and non-radiative, and wherein the structure is a resonant structure having a resonant mode, wherein the structure is configured to exchange the energy when the structure is in the resonant mode, and to store the energy when the structure is not in the resonant mode; transitioning the structure in the resonant mode; receiving an instruction regarding a status of the exchange of the energy; and transitioning the structure out of the resonant mode.

Yet another embodiment discloses a method for transmitting energy wirelessly in a network of nodes from a source node to a sink node through at least one relay node, wherein each node include a structure configured to exchange the energy wirelessly via the coupling of evanescent waves, wherein the structure is electromagnetic (EM) and non-radiative, and wherein the structure is a resonant structure having a resonant mode, wherein the structure is configured to exchange the energy when the structure is in the resonant mode, and to store the energy when the structure is not in the resonant mode, comprising steps of: discovering the relay node to receive the energy; transitioning the structure of the source node and the structure of the relay node in the resonant mode; receiving an instruction regarding a status of the exchange of the energy; and transitioning the structure out of the resonant mode.

DETAILED DESCRIPTION OF THE PREFERRED EMBODIMENTS

Embodiments of the invention are based on a realization that a distance of energy transfer between a source node and a sink node can be increased by a wireless or wireline communication network of relay nodes arranged in the neighborhood of the source and sink.

Figure 2:
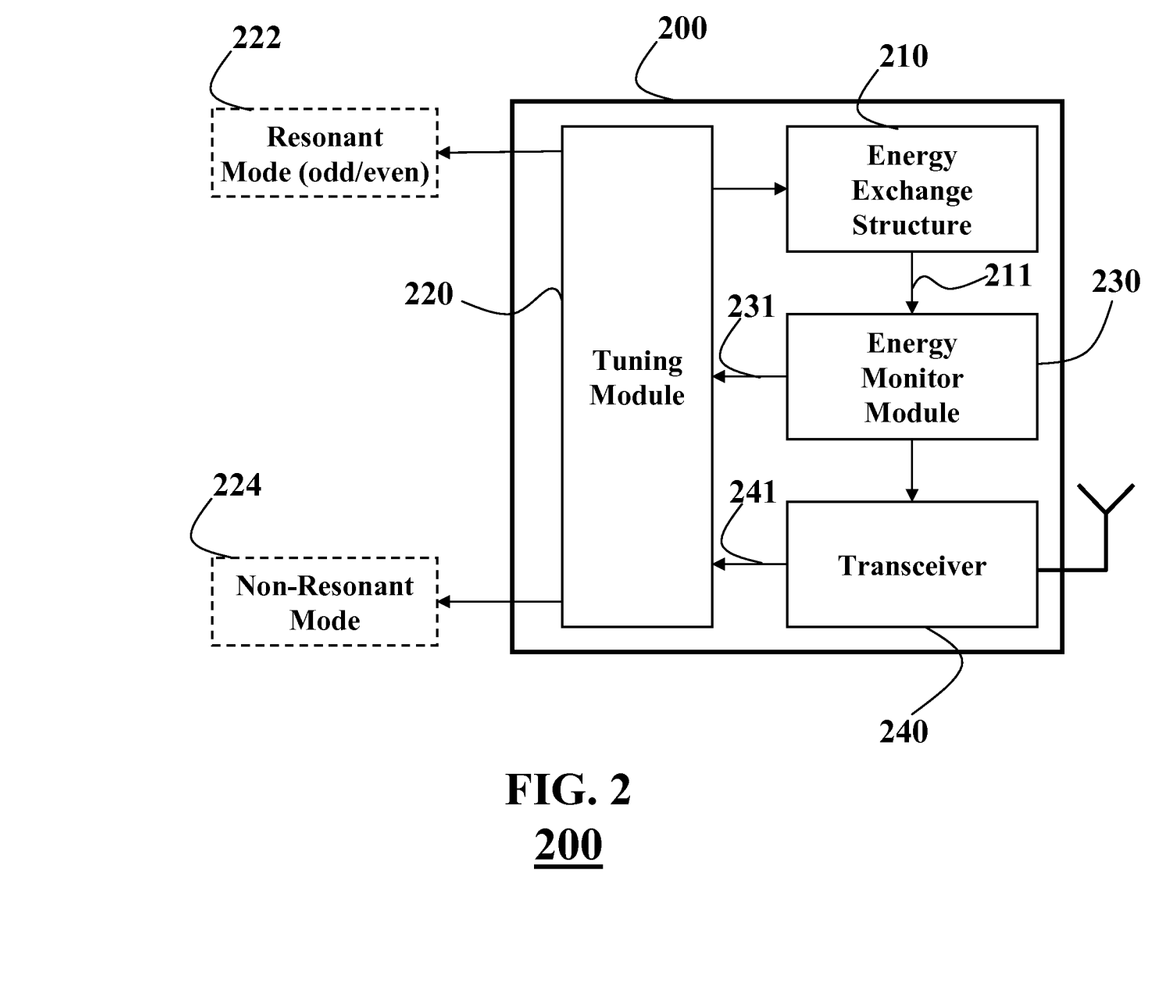
FIG. 2 is block diagram of a system configured to exchange energy wirelessly according embodiments of the invention.

FIG. 2 shows a system 200, i.e., a node of the network, configured to exchange energy wirelessly according an embodiment of the invention. The system 200 includes a structure 210 configured to exchange the energy wirelessly via a coupling of evanescent waves. The structure 210 is electromagnetic (EM), non-radiative, and a resonant structure having a resonant mode. The structure exchanges the energy, e.g., transmit or receive the energy, when the structure is in the resonant mode, and a second structure having the same resonant mode is arranged to enable the coupling of evanescent waves of the structures, as further described below.

A tuning module 220 transitions the structure in and out of the resonant mode according to instruction 231 and/or 241. The instruction 231 is determined by an energy monitor module 230 based on information 211 indicative of the energy stored and/or exchanged by the structure. The instruction 241 is received wirelessly by a transceiver 240 from another node. The instruction can also be received or transmitted via the wireline communication network.

Electromagnetic (EM) Structure

Figure 3:
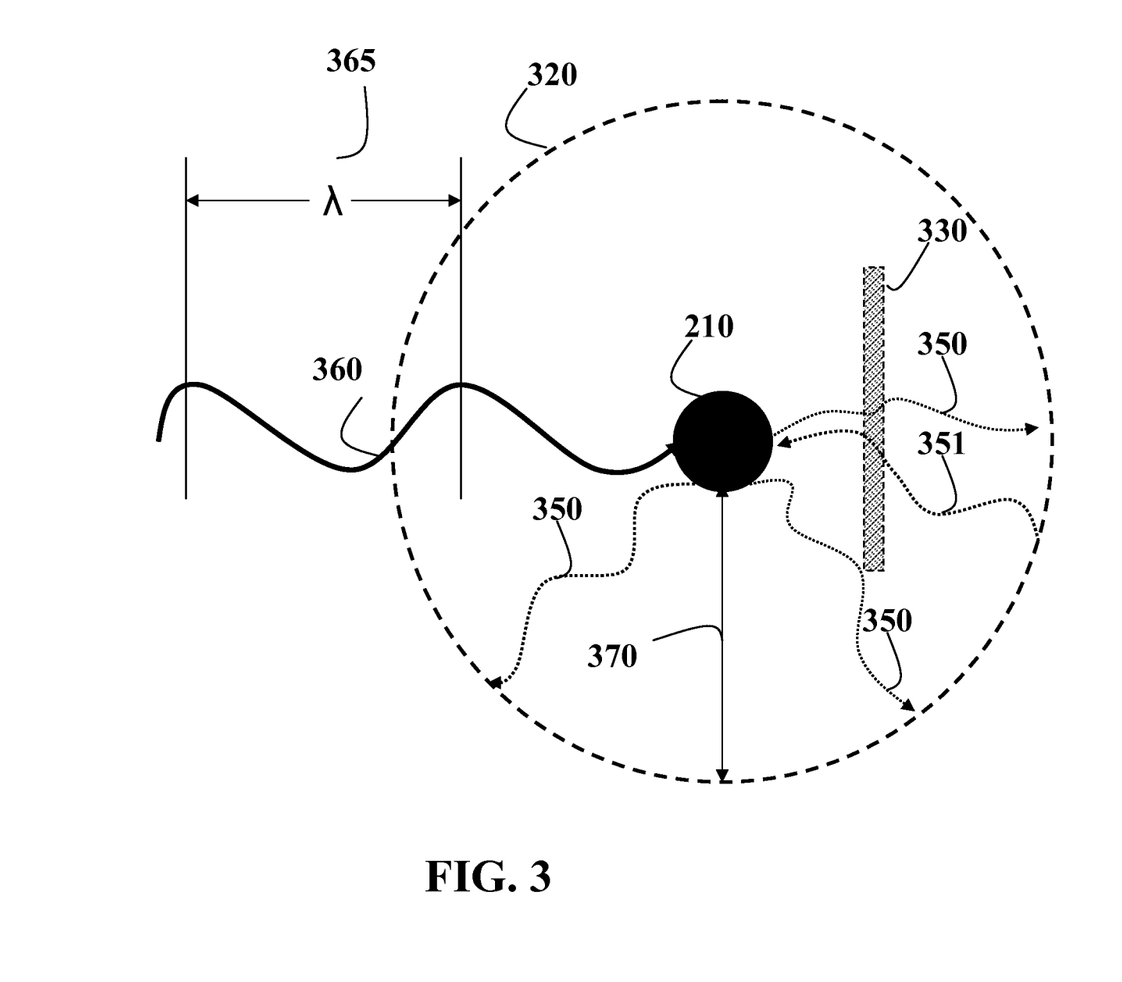
FIG. 3 is block diagrams electromagnetic structure of the system according embodiments of the invention.

FIG. 3 shows an example of the EM non-radiative structure 210 of the system 200 configured to generate an electromagnetic near-field 320 when the energy is received by the structure. Accordingly, the structure is configured to exchange the energy wirelessly via a coupling of evanescent waves.

In one embodiment, the energy 360 is supplied by a driver (not shown) as known in the art. In this embodiment, the system is a source node of the wireless energy transfer system. Similarly, if the energy 360 is supplied wirelessly, then the system is a relay node. If the system is connected to a load, then the system is a sink node.

In one embodiment, the system 200 further includes a negative index material (NIM) 330 arranged within the near-field 320. The NIM is a material with negative permittivity and negative permeability properties. Several unusual phenomena are known for this material, e.g., evanescent wave amplification, surface plasmonic, and negative refraction.

Embodiments of the invention rely on the unusual ability of the NIM to amplify evanescent waves to optimize wireless energy transfer.

As described above, operating two structures at the same resonant frequency ensures that the resonant sink has the appropriate impedance at that frequency, and that the energy is optimally absorbed. Accordingly, when two structures, i.e., a first structure and a second structure, are transitioned into the same resonant mode 222, the two structures are strongly coupled, and the energy is transmitted from the first to the second structure. Typically, the structures support two resonant modes, i.e., the odd resonant mode, and the even resonant mode. However, when the two structures are not in the same resonant mode, i.e., at least one structure in non-resonant mode 224, the structures are not strongly coupled and the energy exchange is minimized. In one embodiment, a frequency of the resonant mode is in a diapason from MHz to GHz. But other frequencies are possible.

Figure 4:
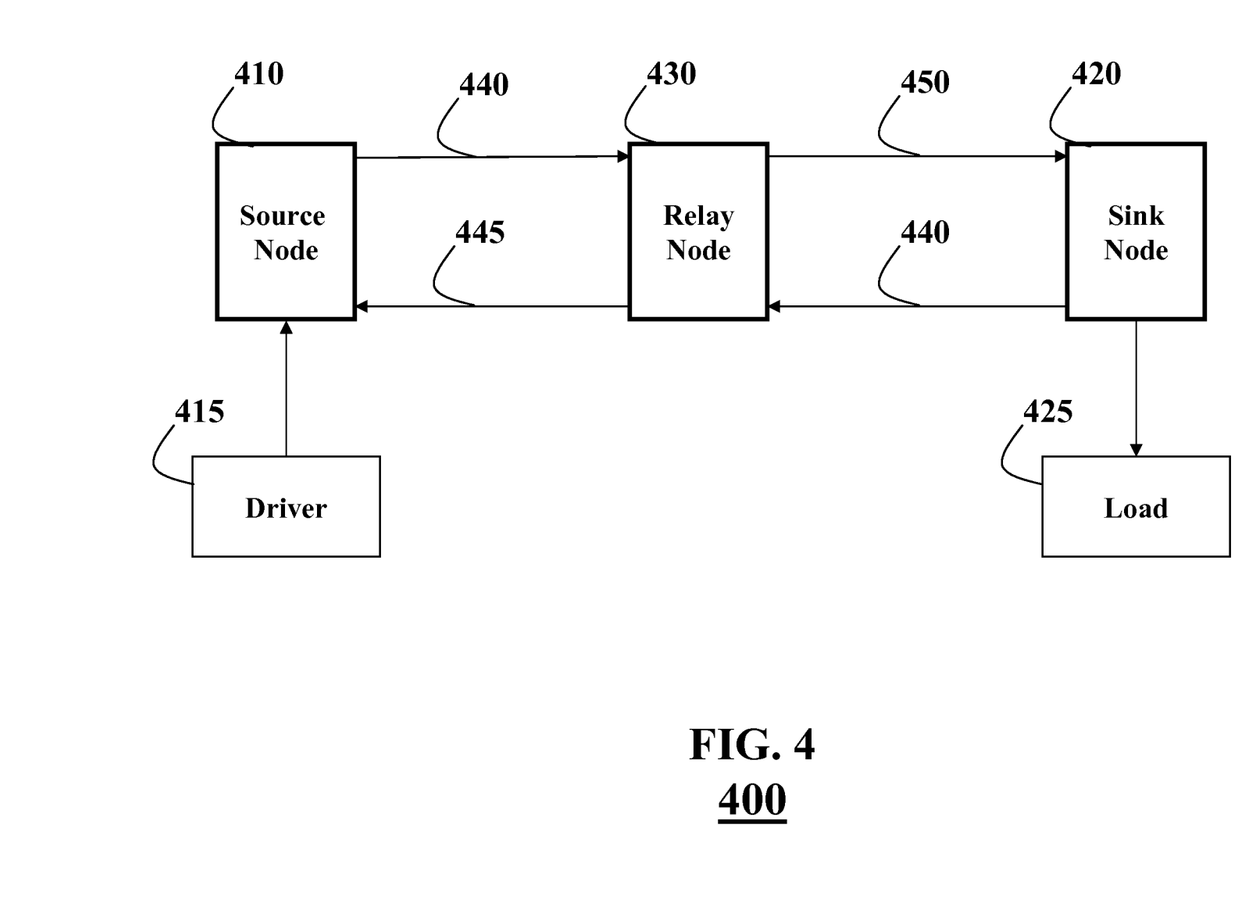
FIG. 4-5 are block diagram of a network of nodes according embodiments of the invention.

FIG. 4 shows a network 400 of nodes, e.g., a source node 410 connected to a driver 415, a sink node 420 connected to a load 425. The network further includes a relay node 430 configured to receive the energy wirelessly from the source node and to transmit the energy wirelessly to the sink node. The number of relay nodes between the source node and the sink node can be arbitrary. The source, the sink, and the relay nodes are each designed according to the system 200.

The driver 415 supplies energy into the source node, e.g., inductively, electromagnetically, or wirelessly using the resonant mode, e.g., by using the odd resonant mode. The resonant mode frequency is known. When the source node is ready to exchange the energy, the energy monitor module generates the instruction based on the information indicative of the energy stored at the source node. The transceiver transmits 440 the instruction to the relay node. In one embodiment, the transceiver of the source node broadcasts the instruction. In another embodiment, the transceiver unicasts the instruction to the relay node.

The relay node, upon receiving the instruction, transitions the structure to the resonant mode, and exchanges the energy with the source node. The energy monitor module of the relay node monitors the energy stored at the relay node and generates the instruction to transition the source node to the non-resonant mode. The instruction is transmitted to the source node, and after the source node is transitioned into the non-resonant mode, the energy is received by the relay node. Next, the instruction to transition to the resonant mode is transmitted to the sink node, thus enabling energy exchange between the relay node and the sink node, and, in effect, between the source node and the sink node.

Figure 5:
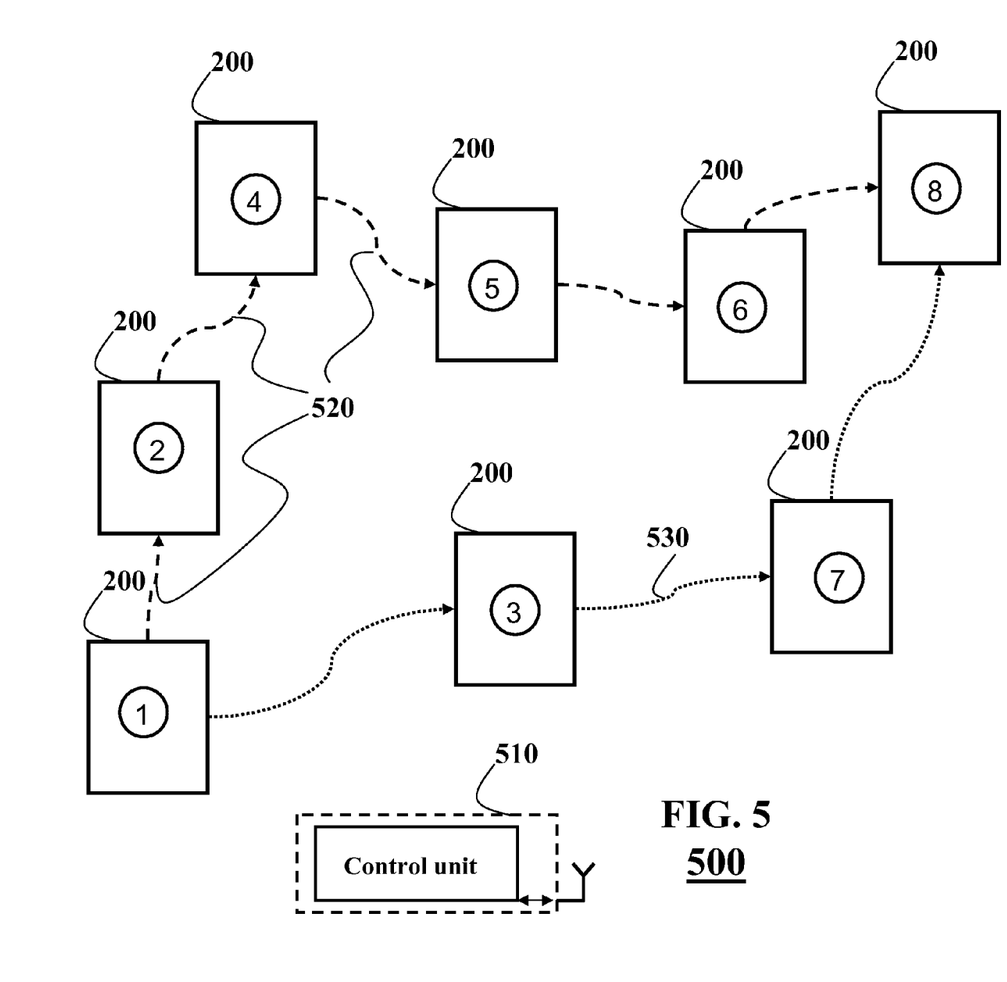

FIG. 5 shows a network 500 with arbitrary arrangement of the nodes designed according the system 200. The network 500 can optionally include mobile nodes. In this embodiment, an optimal route of energy transfer, for example, from the node 1 to the node 8 is discovered. Examples of the optimal route are shown by a dashed line 520 and a dotted line 530.

The discovery process can be performed by the nodes, or by an optional control unit 510. The discovery can be performed for the whole path, or on a node by node basis, i.e., to a next nearest node. The energy exchange is performed similarly to the energy exchange described for the network 400. In one embodiment employing the control unit, the instructions for transitioning the nodes in and out of the resonant mode are received and transmitted by the control unit.

Dual Resonant Configuration

Figure 6:
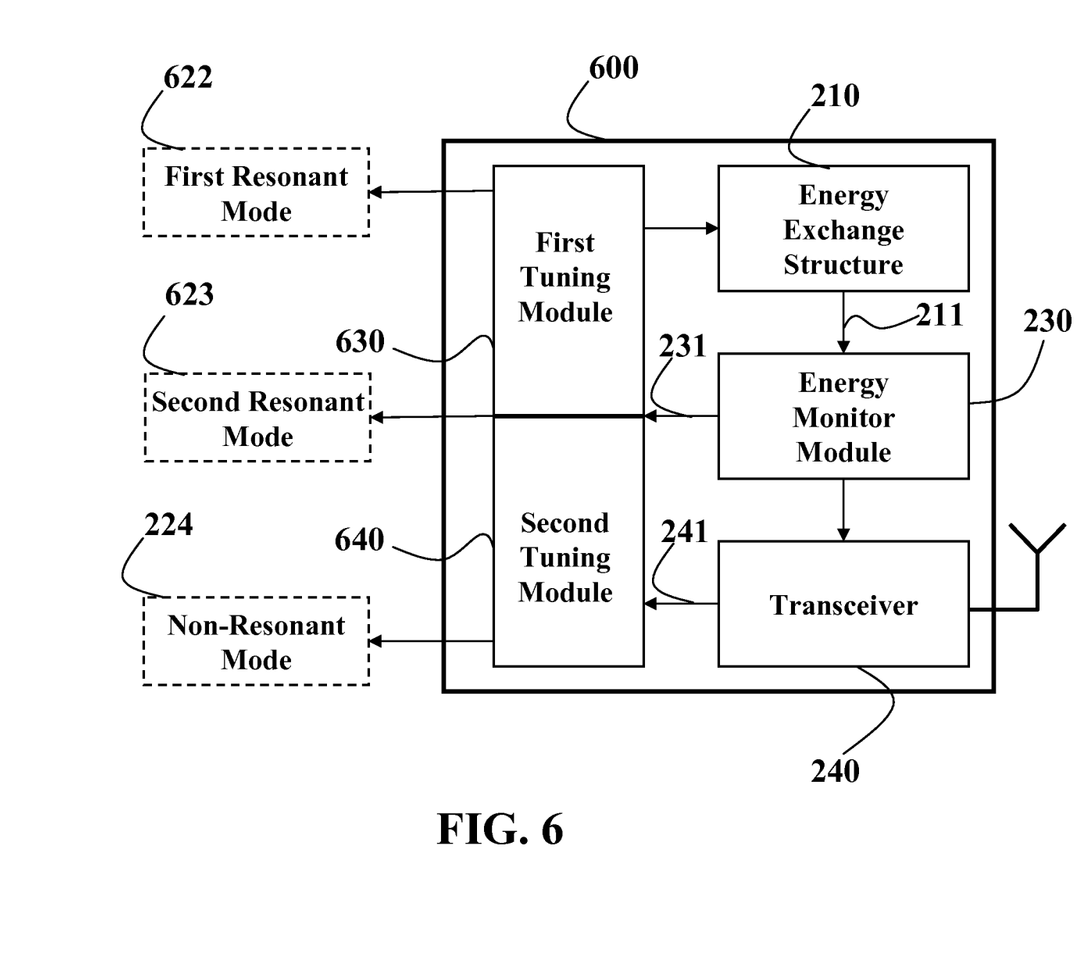
FIG. 6 is a block diagram of an example of a system configured to exchange energy wirelessly.

FIG. 6 shows a dual resonant system 600 supporting dual resonant modes, i.e., a first resonant mode 622 and a second resonant mode 623, such that each of the two resonant modes has a high quality factor. The advantage of such configuration is an ability to concurrently transmit energy using the first resonant mode and receive energy using the second resonant mode. The dual resonant configuration can be achieved by modifying geometry of the EM structure to support two spaced apart resonant frequencies or by simply including two EM structures with two tuning modules 630 and 640 into one system.

Figure 7:
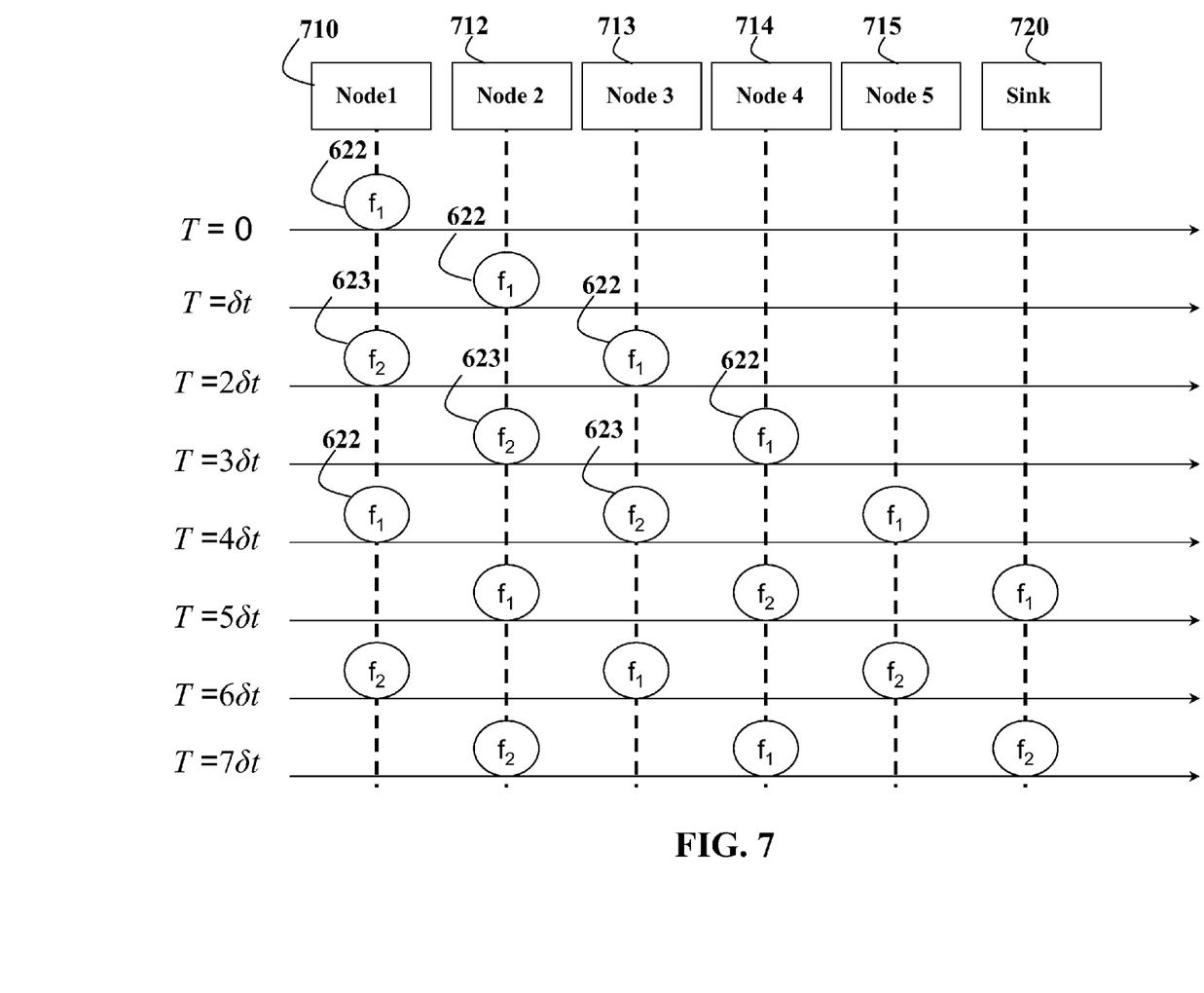
FIG. 7 is a sequence diagram of energy exchange within the network of nodes according to embodiments of the invention.

FIG. 7 shows an example sequence diagram of energy exchange within a network of nodes designed according to the system 600. The energy is transferred from a source node 710 to a sink node 720 through relay nodes 712-715.

The driver supplies the energy to the node 1, and the node 1 transmits the energy to the node 2 as described above. When the node 2 indicates readiness for the energy exchange in the first resonant mode 622, the node 3 transitions into the first resonant mode and receives the energy. The energy monitor module of the node 3 determines that the stored energy reached a threshold, and the transceiver of the node 3 transmits the instruction to the node 2 to detune from the first resonant mode, trapping the energy in the node 3. Then, the energy exchange is initiated between the node 3 and node 4 using the first resonant mode, and between the node 1 and the node 2 using the second resonant mode 623.

The entire process now repeats to establish a continuous transfer of power, from the source node to the sink node. Here, the time needed to transfer the energy from one node to another is δt, which typically is of the order of the inverse of the coupling coefficient between the two nodes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system configured to exchange energy wirelessly, comprising:
   a structure for exchanging the energy wirelessly via a coupling of evanescent waves, wherein the structure is electromagnetic (EM) and non-radiative, and wherein the structure is a resonant structure having a resonant mode, wherein the structure is configured to exchange the energy when the structure is in the resonant mode, and to store the energy when the structure is not in the resonant mode, wherein the resonant mode includes a first resonant mode and a second resonant mode;
   a first tuning module for transitioning the structure in the first resonant mode in response to receiving an instruction to exchange energy, and for transitioning the structure out of the first resonant mode in response to receiving an instruction to store energy; and
   a second tuning module configured to transition the structure in and out of the second resonant mode.

2. The system of claim 1, further comprising:
   a negative index material (NIM) arranged to increase the coupling.

3. The system of claim 1, further comprising:
   a driver configured to supply the energy to the structure.

4. The system of claim 1, further comprising:
   a load configured to receive the energy from the structure.

5. The system of claim 1, further comprising:
   a transceiver for transmitting the instruction to exchange energy.

6. The system of claim 1, further comprising:
   a transceiver for receiving the instruction to exchange energy.

7. The system of claim 1, further comprising:
   a transceiver for receiving the instruction to store energy.

8. The system of claim 1, further comprising:
   an energy monitor module for determining that the structure is ready to exchange the energy and for generating the instruction to exchange energy.

9. The system of claim 1, further comprising:
   an energy monitor module for determining that the structure exchanged the energy and for generating the instruction to store energy.

10. The system of claim 1, wherein the structure is configured to transmit the energy to a next structure, further comprising:
    a discovery module for performing a discovery process to identify the next structure from a plurality of structures.

11. The system of claim 10, further comprising:
    an energy monitor module for determining that the structure is ready to exchange the energy, for generating the instruction to exchange energy, and for submitting the instruction to exchange energy to the tuning module; and
    a transceiver for transmitting the instruction to exchange energy to the next structure, for receiving the instruction to store energy from the next structure, and for submitting the instruction to store energy to the tuning module.

12. A method for exchanging energy wirelessly via a coupling of evanescent waves, comprising steps of:
    providing a structure configured to exchange the energy wirelessly via the coupling of evanescent waves, wherein the structure is electromagnetic (EM) and non-radiative, and wherein the structure is a resonant structure having a resonant mode, wherein the structure is configured to exchange the energy when the structure is in the resonant mode, and to store the energy when the structure is not in the resonant mode;
    transitioning the structure in the resonant mode;
    receiving an instruction regarding a status of the exchange of the energy;
    transitioning the structure out of the resonant mode;
    monitoring the energy stored and/or exchanged by the structure; and
    determining the instruction based on the monitoring.

13. The method of claim 12, wherein the instruction is received wirelessly from a sink.

14. The method of claim 12, further comprising:
    increasing amplitudes of the evanescent waves using a negative index material (NIM), such that the coupling is enhanced.

15. A method for transmitting energy wirelessly in a network of nodes from a source node to a sink node through at least one relay node, wherein each node include a structure configured to exchange the energy wirelessly via the coupling of evanescent waves, comprising:

discovering the relay node to receive the energy;
transmitting, to the relay node, an information indicative of the status of the exchange of the energy;
transitioning the structure of the source node and the structure of the relay node in the resonant mode;
receiving an instruction regarding a status of the exchange of the energy; and
transitioning the structure out of the resonant mode based on the instruction, wherein the structure is electromagnetic (EM) and non-radiative, and wherein the structure is a resonant structure having a resonant mode, wherein the structure is configured to exchange the energy when the structure is in the resonant mode, and to store the energy when the structure is not in the resonant mode.

16. The method of claim 15, wherein the identifying uses a discovery process.

17. The method of claim 15, wherein the status indicates that the node is ready to exchange the energy.

* * * * *